(12) United States Patent
Fenioux (10) Patent No.: US 10,422,406 B2
(45) Date of Patent: Sep. 24, 2019

(54) TORSION FILTERING MECHANISM HAVING A CAM TRACK

(71) Applicant: VALEO EMBRAYAGES, Amiens (FR)

(72) Inventor: Daniel Fenioux, Saleux (FR)

(73) Assignee: Valeo Embrayages, Amiens (FR)

( * ) Notice: Subject to any disclaimer, the term of this patent is extended or adjusted under 35 U.S.C. 154(b) by 277 days.

(21) Appl. No.: 15/456,911

(22) Filed: Mar. 13, 2017

(65) Prior Publication Data

US 2017/0268598 A1    Sep. 21, 2017

(30) Foreign Application Priority Data

Mar. 16, 2016   (FR) ..................................... 16 52210
Mar. 16, 2016   (FR) ..................................... 16 52211

(51) Int. Cl.
*F16F 15/121* (2006.01)

(52) U.S. Cl.
CPC ...... *F16F 15/1215* (2013.01); *F16F 15/1213* (2013.01)

(58) Field of Classification Search
CPC .......................... F16F 15/1215; F16F 15/1213
USPC .............................................. 464/77, 84, 101
See application file for complete search history.

(56) References Cited

U.S. PATENT DOCUMENTS

| | | | | |
|---|---|---|---|---|
| 784,397 | A | * | 3/1905 | Halle ............................... 464/77 |
| 1,543,360 | A | * | 6/1925 | Bjering ...................... F16D 3/12 464/84 |
| 6,471,024 | B2 | | 10/2002 | Ota et al. |
| 2015/0369296 | A1 | | 12/2015 | Lopez-Perez |
| 2017/0234399 | A1 | * | 8/2017 | Durham .................. F16H 45/02 |
| 2017/0363195 | A1 | * | 12/2017 | Durham .............. F16F 15/1333 |

FOREIGN PATENT DOCUMENTS

| | | | | |
|---|---|---|---|---|
| DE | 21764 | * | 8/1961 | ...................... 464/84 |
| EP | 2959181 A1 | | 3/2017 | |
| FR | 400100 | * | 7/1909 | ...................... 464/77 |
| FR | 3000155 A1 | | 6/2014 | |

(Continued)

OTHER PUBLICATIONS

Rebull, L. M., "How to Make a Graph" University of Chicago Winter Quarterly 1994 [online] [retrieved on Feb. 8, 2019], Retrieved from the Internet: <URL: http://astro.uchicago.edu/cara/outreach/resources/other/howtograph.html>. (Year: 1994).*

(Continued)

*Primary Examiner* — Greg Binda
(74) *Attorney, Agent, or Firm* — Berenato & White, LLC (57) ABSTRACT

A torsion filtering mechanism (22) has a first rotating member (24), a second rotating member (26) movable with respect to the first rotating member (24), a cam track (60) rotating with one (24) of the rotating members, and at least one associated cam follower (36) carried by the other (26) rotating member. The cam track (60) has, in a section plane perpendicular to the axis of revolution, a profile constituted by a plurality of circular arcs (A0, A1, A2, A3, A4) adjacent pairwise and having an intersection point pairwise. Any two adjacent circular arcs from among the circular arcs have different finite or infinite radii of curvature, and indistinguishable tangents at the intersection point.

19 Claims, 6 Drawing Sheets

(56) References Cited

FOREIGN PATENT DOCUMENTS

| FR | 3008152 A1 | 1/2015 |
| FR | 3045117 A | 6/2017 |
| WO | WO2011006264 A1 | 1/2011 |
| WO | WO2016020584 A1 | 2/2016 |
| WO | WO2016020585 A1 | 2/2016 |

OTHER PUBLICATIONS

Corresponding French Search Report for FR1652211.
Corresponding French Search Report for FR1652210.

\* cited by examiner

TORSION FILTERING MECHANISM HAVING A CAM TRACK

CROSS-REFERENCE TO RELATED APPLICATIONS AND CLAIM TO PRIORITY

This application is related to Patent Application No. 1652210 and Patent Application No. 1652211 both filed Mar. 16, 2016 in France, the disclosures of which are incorporated herein by reference and to which priority is claimed.

FIELD OF THE INVENTION

The invention relates to a torsion filtering mechanism and more specifically to a torsion filtering mechanism for a torque transmission device, in particular for a motor vehicle, specifically for a clutch device, for example for a dual mass flywheel, for a pendulum oscillator, for a long-travel damper, placed upstream or downstream from a friction clutch or downstream from a torque converter.

BACKGROUND OF THE INVENTION

Torque converters which have a first member rotating around an axis of revolution, a second member rotating around the axis of revolution and movable with respect to the rotating first member between two angular limit positions, and coil, straight, or curved springs disposed between the two rotating members to allow kinetic energy to be converted into potential energy and, conversely, potential energy into kinetic energy when the rotating members rotate with respect to one another, if applicable with interposition of energy dissipation elements, are known. These dampers having coil springs are relatively bulky and do not offer wide design freedom for adapting, as necessary, the angular stiffness between the rotating members. Their dynamic behavior, bearing in mind centrifugal effects, is furthermore difficult to manage, especially due to friction between the springs and the walls of their receptacles.

The document FR 3 000 155 proposes to replace the coil springs with flexible blades carried by one of the rotating members of the damper, these flexible blades forming cam tracks associated with cam followers carried by the other rotating member. The relative rotational movement between the rotating members causes flexing of the flexible blades when the cam followers are displaced on the cam tracks. The profile of the cam tracks can be adapted in order to vary the angular stiffness as a function of angular deflection.

This document does not, however, teach a simple approach to determining a cam profile conforming to a desired characteristic curve, thus necessitating considerable trial and error. In addition, the proposed cam profiles are not adapted for industrial production, in particular because they lend themselves poorly to dimensional quality controls.

SUMMARY OF THE INVENTION

The invention aims to eliminate the disadvantages of the existing art and to propose a damper that provides the desired dimensioning freedom while retaining a simple cam profile.

To achieve this, according to a first aspect of the invention a torsion filtering mechanism for a torque transmission device, in particular for an automobile, in particular for a clutch device, is proposed, the torsion filtering mechanism having:

a first rotating member capable of rotating around an axis of revolution of the torsion filtering mechanism;

a second rotating member capable of rotating around the axis of revolution and oscillating with respect to the first rotating member;

at least one cam track carried by one of the first and second rotating members, the cam track being fixed rotationally around the axis of revolution with respect to the rotating member carrying the cam track, and being elastically connected to the rotating member carrying the cam track, in order to exhibit a degree of freedom of movement with respect to the rotating member carrying the cam track; and at least one cam follower associated with the cam track and carried by the other of the first and second rotating members, the cam follower being capable of traveling along the cam track between a retrograde end of the cam track and a forward end of the cam track, while causing a variable displacement of the cam track with respect to the rotating member carrying the cam track.

According to the invention the cam track has, in a section plane perpendicular to the axis of revolution, a profile having a plurality of circular arcs adjacent pairwise and having an intersection point pairwise, the profile being such that at least two adjacent circular arcs from among the circular arcs have different finite or infinite radii of curvature, and indistinguishable tangents at the intersection point.

The stiffness for a given angular deflection between the two rotating members can be increased or decreased in the design stage in very simple fashion by increasing or decreasing the corresponding radius of the circular arc. In the case of a convex cam track, the transition from an arc having a given radius of curvature to an arc having a greater radius of curvature, in a given oscillation direction, corresponds to an increase in angular stiffness when the cam follower travels along the cam track in that direction, and to a decrease when the cam follower travels along the cam track in the opposite direction. In the case of a concave cam track, the transition from an arc having a given radius of curvature to an arc having a greater radius of curvature, in a given oscillation direction, corresponds to a decrease in angular stiffness when the cam follower travels along the cam track in that direction, and to an increase when the cam follower travels along the cam track in the opposite direction. These correlations are valid whether the cam track faces oppositely from the axis of revolution or toward the axis of revolution.

The dimensions of the cam profile, which is constituted by a succession of circular arcs, can easily be checked in order to determine a part's conformity upon completion of manufacture.

Preferably the profile is such that every pair of adjacent circular arcs from among the circular arcs is constituted by circular arcs having different finite or infinite radii of curvature, and indistinguishable tangents at the intersection point. This avoids discontinuities in the cam track slopes, and the shocks they can generate.

Preferably the profile is constituted by the plurality of circular arcs.

Preferably the plurality of circular arcs is constituted by at most ten circular arcs. Too large a number of circular arcs makes conformity checks too complex. In practice, depending on applications, satisfactory results are obtained with a rolling track profile constituted by three, four, five, six, seven, eight, nine, or ten circular arcs.

Preferably the plurality of circular arcs has at least three circular arcs. Too small a number of circular arcs does not offer the freedom necessary for demanding applications.

According to an embodiment, at least one circular arc of the profile has a circular arc adjacent toward the forward end of the cam track from among the circular arcs of the profile, and a circular arc adjacent toward the retrograde end of the cam track from among the circular arcs of the profile, and has a radius greater than the radius of the circular arc adjacent toward the forward end of the cam track and greater than the radius of the circular arc adjacent toward the retrograde end of the cam track. In the case of a convex cam track, for example, this configuration is expressed by the fact that the angular stiffness of the filtering mechanism passes through a relative maximum in the range of angular deflection between the two rotating members which corresponds to a contact between the cam follower and the circular arc having a greater radius of curvature than the adjacent circular arcs.

According to an embodiment, at least one circular arc of the profile has a circular arc adjacent toward the forward end of the cam track from among the circular arcs of the profile, and a circular arc adjacent toward the retrograde end of the cam track from among the circular arcs of the profile, and has a radius less than the radius of the circular arc adjacent toward the forward end of the cam track and less than the radius of the circular arc adjacent toward the retrograde end of the cam track. In the case of a convex cam track, for example, this configuration is expressed by the fact that the angular stiffness of the filtering mechanism passes through a relative minimum in the range of angular deflection between the two rotating members, which corresponds to contact between the cam follower and the circular arc having a lesser radius of curvature than the adjacent circular arcs. As applicable, the cam track can combine one or more relative maximums and one or more relative minimums.

Preferably the cam track faces radially in a direction of abutment against the cam follower. The cam follower defines a pitch circle for contact with the cam track, centered on the axis of revolution. In at least one reference position of the filtering mechanism, the profile is at a positive or zero distance from the pitch circle, measured in the abutment direction, at every point. This makes it possible to ensure, in the case of a cam follower remaining at a fixed distance from the axis of revolution, that contact always exists between the cam follower and the cam track. In the reference position, the cam follower is preferably in abutment against a so-called reference circular arc of the profile at a so-called reference contact point, the line normal to the reference circular arc at the reference contact point intersecting the axis of revolution. The reference position is thus an equilibrium position in which the moment of the contact forces between the cam follower and cam track with respect to the axis of revolution is zero.

According to a particularly interesting embodiment, the profile is such that when the filtering mechanism is in the reference position, at least one of the circular arcs of the profile moves closer to the pitch circle while moving away from the reference contact point. This movement toward the pitch circle corresponds to a negative angular stiffness.

Preferably the profile has at least two circular arcs directly adjacent to the reference circular arc, on either side of the reference circular arc. Oscillations on either side of the reference position are therefore possible.

According to an embodiment, the cam track faces radially outward and the cam follower is arranged radially outside the cam track. This disposition is advantageous from the standpoint of radial size. It furthermore allows the cam follower to absorb radial centrifugal loads experienced by the cam track. According to this hypothesis, provision is preferably made that the reference circular arc has a finite or infinite radius that is always greater than the radius of the pitch circle. Advantageously, the profile has a circular arc (A1) that is directly adjacent to the reference circle and has a radius always less than the radius of the reference circle. Preferably the two circular arcs directly adjacent to the reference circular arc on either side of the reference circular arc each have a finite radius that is always less than the radius of the reference circular arc. The reference circular arc corresponds to a portion of the cam track having a lever arm that decreases to zero at the reference point in both the forward direction and the retrograde direction. The reference point thus defines a stable equilibrium position of the filtering mechanism.

According to another embodiment, the cam track faces radially inward and the cam follower is arranged radially inside the cam track.

Preferably the cam follower has a follower roller.

According to an embodiment having a particularly simple and reliable structure, the cam track is formed on a flexible blade having a base fastened to the rotating member carrying the cam track. It is equally conceivable, however, to provide a cam connected by a spring applied onto the rotating member carrying the cam track.

According to an embodiment, the torsion filtering mechanism furthermore comprises:
- at least one other cam track carried by one of the first and second rotating members, the other cam track being rotationally fixed around the axis of revolution with respect to the rotating member carrying the other cam track and elastically connected to the rotating member carrying the other cam track, in order to exhibit a degree of freedom of movement with respect to the rotating member carrying the other cam track; and
- at least one other cam follower associated with the other cam track and carried by the other of the first and second rotating members, the other cam follower traveling along the other cam track and causing a variable displacement of the other cam track with respect to the rotating member carrying the other cam track.

The other cam track exhibits, in a section plane perpendicular to the axis of revolution, a profile constituted by a plurality of circular arcs adjacent pairwise, the profile being such that any two adjacent circular arcs from among the circular arcs have different radii of curvature and one intersection point, and have indistinguishable tangents at the intersection point.

Preferably the two cam tracks are carried by the same rotating member for better balancing of the radial components of the loads exerted on the cam tracks and on the cam followers. The disposition of the cam tracks and cam followers can be symmetrical with respect to the axis of revolution, which allows natural balancing of the rotating masses. It is also possible to conceive of a filtering mechanism having more than two cam tracks, for example three or four cam tracks. It can be envisaged that certain cam tracks, for example two identical opposite cam tracks, are carried by one of the rotating members and that certain other cam tracks, for example two other identical opposite cam tracks, are fastened to the other rotating member.

Particularly advantageously, it is conceivable to provide that the cam track and the other cam track have different profiles. In particular, a cam track profile having increasing radii can be selected for one of the cam tracks, and one having decreasing radii for the other, which can make it possible to create, in highly controlled fashion, a wide angular deflection range in which the angular stiffness is practically zero. It is thereby also possible to transmit elevated torques with a controlled constant stiffness.

Preferably, the profile of the cam track and the profile of the other cam track are such that within a given angular oscillation range having an amplitude greater than 20°, and preferably greater than 30°, and preferably greater than 40°, for the second rotating member with respect to the first rotating member, the torsion filtering mechanism has an angular stiffness having an absolute value of less than 180 Nm/rad, preferably less than 120 Nm/rad, for example less than 60 Nm/rad. The wider this angular deflection range, the greater the ability of the filtering mechanism to filter large fluctuations in torque for torques whose absolute values remain low.

According to an embodiment, in a given range of angular oscillation of the second rotating member with respect to the first rotating member, and in a given oscillation direction, interaction between the cam track and the cam follower produces a torque on the first rotating member in a given direction, and interaction between the other cam track and the other cam follower produces another torque on the first rotating member in the direction opposite to the given direction. Within this angular range the resulting torque can be zero or very low.

Particularly advantageously, the profile of the cam track and the profile of the other cam track are such that within a given range of angular oscillation, having an amplitude greater than 10°, of the second rotating member with respect to the first rotating member, the mechanism exhibits an angular stiffness having an absolute value greater than 750 Nm/rad, preferably greater than 800 Nm/rad, preferably greater than 850 Nm/rad. This high stiffness over a sufficient angular range allows the filtering mechanism to accept high torques.

Preferably there exists at least one angular oscillation position of the second rotating member which corresponds to a contact between the cam follower and one of the intersection points of two circular arcs of one of the cam profiles and which does not correspond to a contact between the other cam follower and one of the intersection points of two circular arcs of the profile of the other cam track. It is thereby possible to multiply the angular positions corresponding to a transition from one of the cam followers of a circular arc to another, and thereby to refine the response characteristic of the filtering mechanism, while retaining cam profiles that are simple, i.e. that each comprise a limited number of circular arcs.

Preferably the other cam track faces radially in a direction of abutment against the other cam follower, such that the other cam follower defines a pitch circle for contact with the other cam track centered on the axis of revolution and such that, in the reference position of the filtering mechanism, the profile of the other cam track is at all points at a positive or zero distance from the contact pitch circle defined by the other cam follower, measured in the direction of abutment against the other cam follower, and such that in the reference position, the other cam follower is in abutment against a so-called reference circular arc of the profile of the other cam track at a so-called reference contact point, the line normal to the reference circular arc of the profile of the other cam track, at the reference contact point on the reference circular arc of the profile of the other cam track, intersecting the axis of revolution.

Preferably the other cam track also faces radially outward and the other cam follower is arranged radially outside the other cam track. This disposition is advantageous from the point of view of radial size. It furthermore allows the cam follower to absorb radial centrifugal loads experienced by the cam track.

According to another embodiment, the other cam track also faces radially inward, and the other cam follower is arranged radially inside the other cam track.

According to an embodiment having a particularly simple and reliable structure, the other cam track is formed on a flexible blade having a base fastened to the rotating member carrying the other cam track. It is equally conceivable, however, to provide a cam connected by a spring applied onto the rotating member carrying the cam track.

According to an embodiment, the profile of the other cam track comprises a plurality of other circular arcs adjacent pairwise and having an intersection point pairwise, the profile of the other cam track being such that at least two adjacent circular arcs from among the other circular arcs have different finite or infinite radii of curvature and indistinguishable tangents at the intersection point. Preferably the plurality of other circular arcs is constituted by at least three and/or at most ten other circular arcs.

According to an aspect of the invention, the purpose of the filtering mechanism according to the invention is to transmit a torque between a driving member connected to one of the first and second rotating members and a driven member connected to the other of the first and second rotating members. The invention therefore also relates to a kinematic torque transmission drivetrain constituting a torque path between a driving member and a driven member, characterized in that it has a filtering mechanism as described above, the first and second rotating members being located in the torque path between the driving member and driven member.

The invention therefore relates in particular to a dual mass flywheel having a primary flywheel and a secondary flywheel, the dual mass flywheel incorporating a torsion filtering mechanism as described above, the primary flywheel being constituted by the first rotating member and the secondary flywheel by the second rotating member. According to this hypothesis, the secondary flywheel is intended and configured to be connected to a driven member, for example a friction clutch plate.

Analogously, the invention is also directed toward a long-travel damper incorporating the torsion filtering mechanism according to the invention.

A further purpose of the filtering mechanism according to the invention, in accordance with another aspect of the invention, is to be incorporated into an inertial deflector or a pendulum oscillator disposed in bypass fashion with respect to the torque path between a driving member and a driven member. The invention therefore also relates in particular to a damping mechanism having an input member and an output member connected by a kinematic torque transmission drivetrain, having a filtering mechanism as described above whose first rotating member is constituted by the input member, the output member, or an element of the kinematic transmission drivetrain between the input member and output member, the second rotating member being disposed in bypass fashion with respect to the kinematic torque transmission drivetrain. It also relates to a kinematic torque transmission drivetrain constituting a torque path between a driving member and a driven member, characterized in that it has a filtering mechanism as described above, one of the first and second rotating members being located in the torque path between the driving member and driven member, the other of the first and second rotating members being outside the torque path between the driving member and driven member.

BRIEF DESCRIPTION OF THE DRAWINGS

Other characteristics and advantages of the invention will become evident from a reading of the description below that refers to the attached Figures, in which.

For greater clarity, identical or similar elements are labeled with identical reference characters in all the Figures.

DETAILED DESCRIPTION OF THE PREFERRED EMBODIMENT(S)

Figure 1:
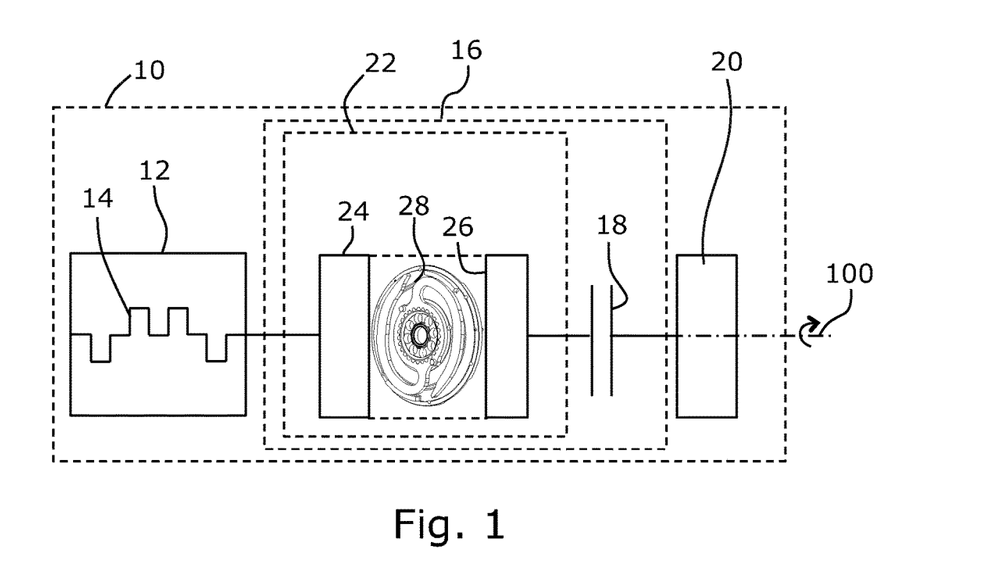
FIG. 1 is a schematic view of a propulsion assemblage according to an embodiment of the invention, having a dual mass flywheel incorporating a torsion filtering mechanism according to an embodiment of the invention.

FIG. 1 illustrates a motor vehicle propulsion assemblage 10 having an internal combustion engine 12 whose crankshaft 14 drives a kinematic transmission drivetrain 16 having a dry clutch 18 arranged upstream from a gearbox input shaft 20. Disposed kinematically between crankshaft 14 and friction clutch 18 in kinematic transmission drivetrain 16 is a torsion filtering mechanism 22 that constitutes a dual mass flywheel and has an input member constituted by a primary flywheel 24 integral with crankshaft 14 and an output member constituted by a secondary flywheel 26 integral with a reaction plate of clutch 18 or made as a single piece therewith. Elastic members 28 are interposed between primary flywheel 24 and secondary flywheel 26 so as to operate in the context of angular position fluctuations between primary flywheel 24 and secondary flywheel 26. Crankshaft 14, damping mechanism 22, clutch 18, and input shaft 20 of the gearbox rotate around a single axis of revolution 100.

Figure 2:
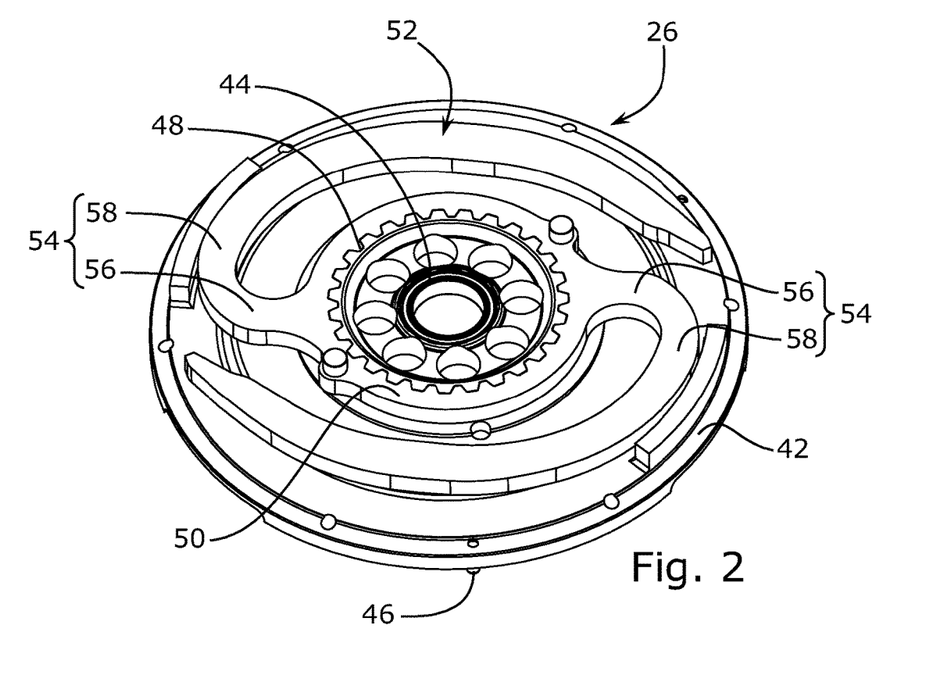
FIG. 2 is a perspective view of a portion of the dual mass flywheel of the propulsion assemblage of FIG. 1.
Figure 3:
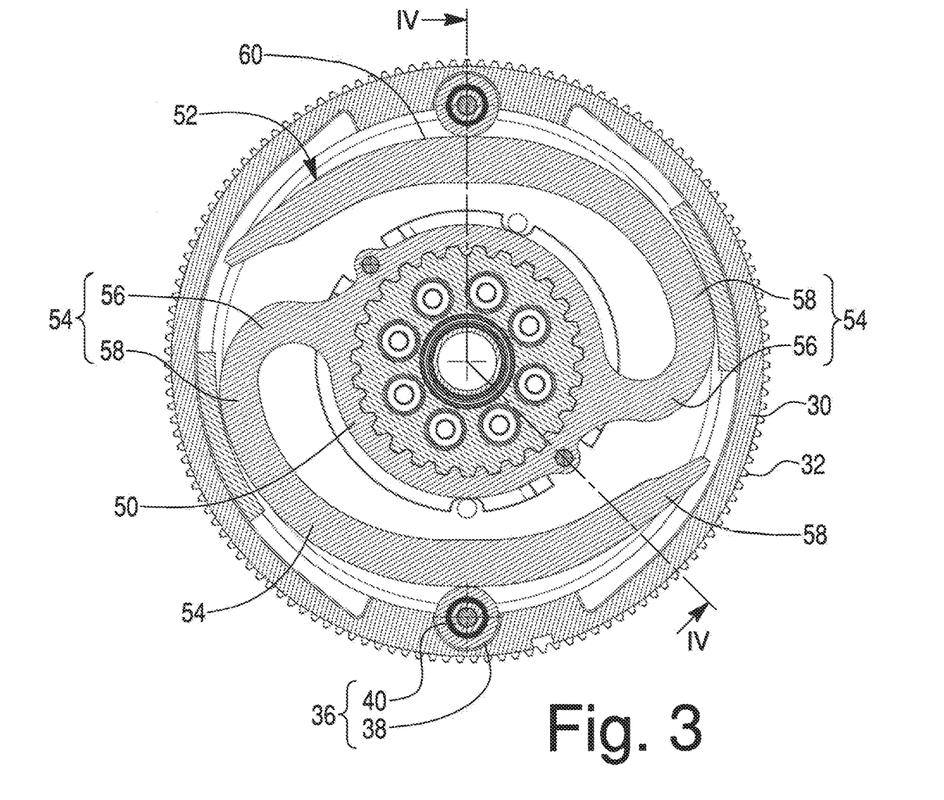
FIG. 3 is a frontal view of a portion of the dual mass flywheel of FIG. 2 showing in particular a flexible blade of the filtering mechanism.
Figure 4:
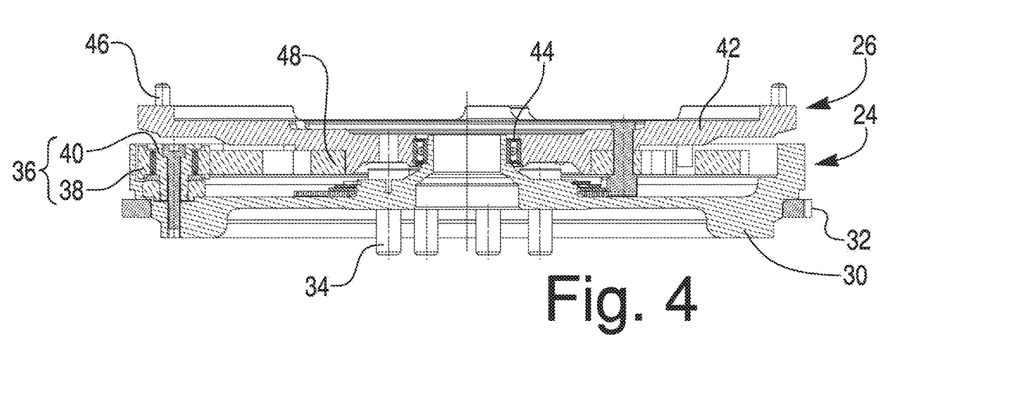
FIG. 4 is a section view of the dual mass flywheel of FIG. 2.

The structure of dual mass flywheel 22 is illustrated in detail in FIGS. 2 to 4. Primary flywheel 24 is made up of a plate 30 on which is fastened a ring gear 32 for connection to a starter (not depicted). Plate 30 of primary flywheel 24 is intended to be mounted, by way of screws 34, on a terminal flange of crankshaft 14. Primary flywheel 24 supports cam followers 36, in this case two in number. Each cam follower 36 is constituted by a roller 38 mounted, by means of a needle bearing or a plain bearing, on a pivot 40 fastened to plate 30, so as to rotate around an axis that is parallel to axis of revolution 100 and is fixed with respect to primary flywheel 24.

Secondary flywheel 26 forms a solid plate 42 that also constitutes a reaction plate of friction clutch 18. A rolling bearing 44 provides rotational guidance of secondary flywheel 26 with respect to primary flywheel 24. Studs 46 allow plate 42 to be fastened to a clutch cover (not depicted). Secondary flywheel 26 furthermore forms a splined hub 48, which projects axially with respect to plate 42 and onto which is shrink-fitted annular body 50 of a one-piece elastic member 52 having curved flexible blades 54, here two in number. Each flexible blade 54 has a bent base 56 extending substantially radially outward with respect to annular body 50, prolonged by an elongated curved arm 58 which extends circumferentially and on which is formed a cam track 60 facing radially outward and arranged radially inside of, and facing toward, one of rollers 38. Each flexible blade 54 is thus associated with one of rollers 38 that rolls on the associated cam track 60.

Remarkably, cam track 60 exhibits, in a section plane perpendicular to axis of revolution 100, a profile constituted by a succession of circular arcs, some of which can have an infinite radius and can constitute straight line segments.

Figure 5:
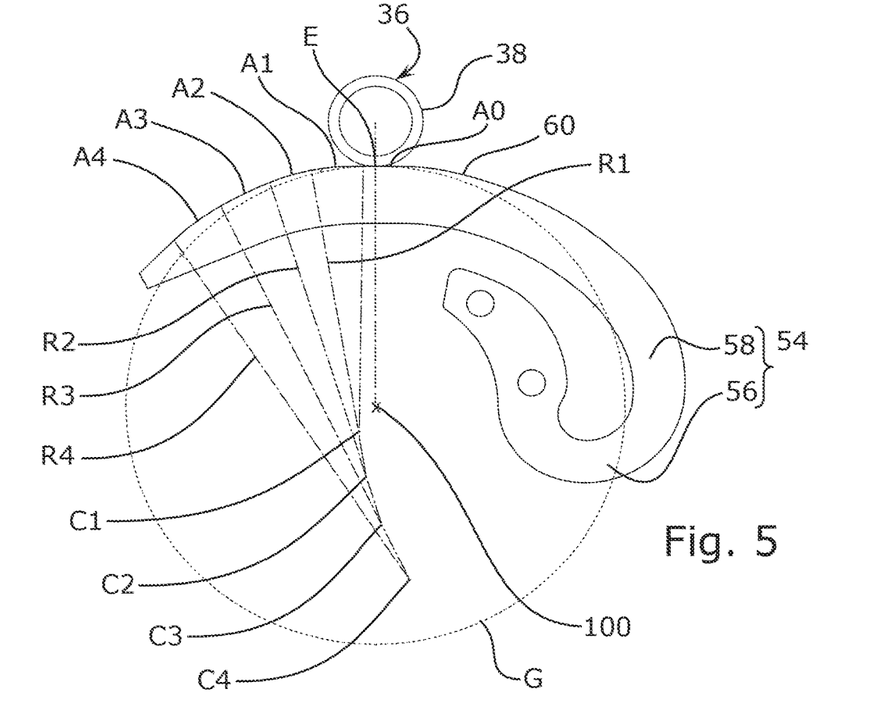
FIG. 5 is a schematic view of a profile of a cam track of the flexible blade of FIG. 3.

According to the embodiment illustrated in FIG. 5, for example, the profile is constituted by a straight line segment A0 (circular arc of infinite radius), followed successively by four circular arcs A1, A2, A3, and A4 having centers C1, C2, C3, C4 and radii R1, R2, R3, R4 that are different pairwise and in this case increase pairwise, so that R1<R2<R3<R4. At their intersection point, two adjacent circular arcs have a common tangent. Circular arc A1 is also tangent to straight line segment A0. Remarkably, there exists a reference point E of straight line segment A0 for which the line normal to the straight line segment passes through axis of revolution 100 of the filtering mechanism. At this reference point E, the contact load between flexible blade 54 and cam follower 36 is entirely radial with respect to axis of revolution 100, and causes no torque. This is therefore an equilibrium position. This equilibrium position is stable because on either side of reference point E, cam track 60 is located radially outside of pitch circle G defined by the path of the contact point between roller 38 of cam follower 36 and cam track 60 when first rotating member 24 rotates with respect to the second member 26.

Cam track 60 of FIG. 5 is convex, and circular arcs A0 to A4 are in this case all arranged radially outside pitch circle G with respect to the axis of revolution, at least in the reference position corresponding to contact between roller 38 and reference point E. The centers of curvature and the radii of the successive circular arcs are selected so that in the reference position corresponding to contact between roller 38 and reference point E, the distance between the axis of revolution and a current point on the cam track increases continuously as that point moves away from the reference point.

This ensures that when the primary flywheel rotates with respect to the secondary flywheel in a direction that will be arbitrarily called the "forward direction," the roller of the cam follower rolls on the associated cam track while moving away from reference point E and approaching the free end, producing increasing bending of the flexible blade.

Figure 6:
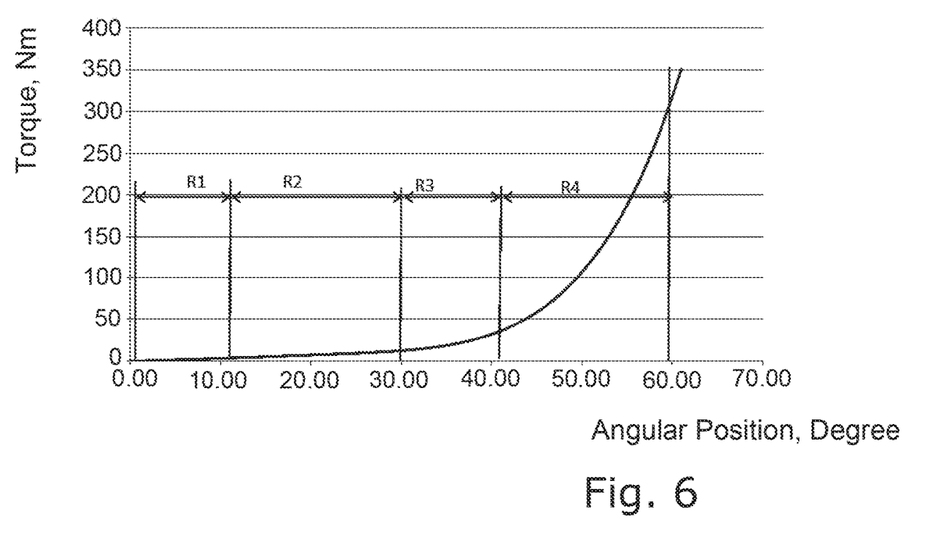
FIG. 6 is a graph of a characteristic curve of the torque of the filtering mechanism corresponding to the profile of FIG. 5.

This results in a correlation between torque and angular position which is illustrated by the graph of FIG. 6, in which the abscissa axis represents values for angular position increasing in the forward direction from the position of reference point E, and the ordinate axis represents absolute values for the corresponding static torque. It is evident that the torque is a continuous monotonic increasing function of angular position. In other words, the torque increases, continuously and with no discontinuity, with angular position. It is also evident that the derivative of the aforementioned function is a monotonic continuous increasing function, in other words that the angular stiffness also increases continuously with angular position.

As applicable, the cam track can continue in a retrograde direction beyond segment A0. In such a case, what has been described here regarding the region of the cam track traveled along by the cam follower when the primary flywheel rotates with respect to the secondary flywheel in the forward direction from reference point E also applies to that portion of the cam track traveled along by the cam follower starting from the equilibrium point when the primary flywheel rotates with respect to the secondary flywheel in the retrograde direction. In this region as well, the cam track is constituted by successive circular arcs co-tangent at their intersection points.

It thus becomes possible to design a simple cam surface that defines a characteristic curve for angular stiffness with respect to the angular positioning between the primary flywheel and secondary flywheel. In particular, this design using successive circular arcs simplifies dimensional checks in the production process.

Successive circular arcs can of course be selected in order to obtain different cam profiles and different variations in torque and angular stiffness.

Figure 7:
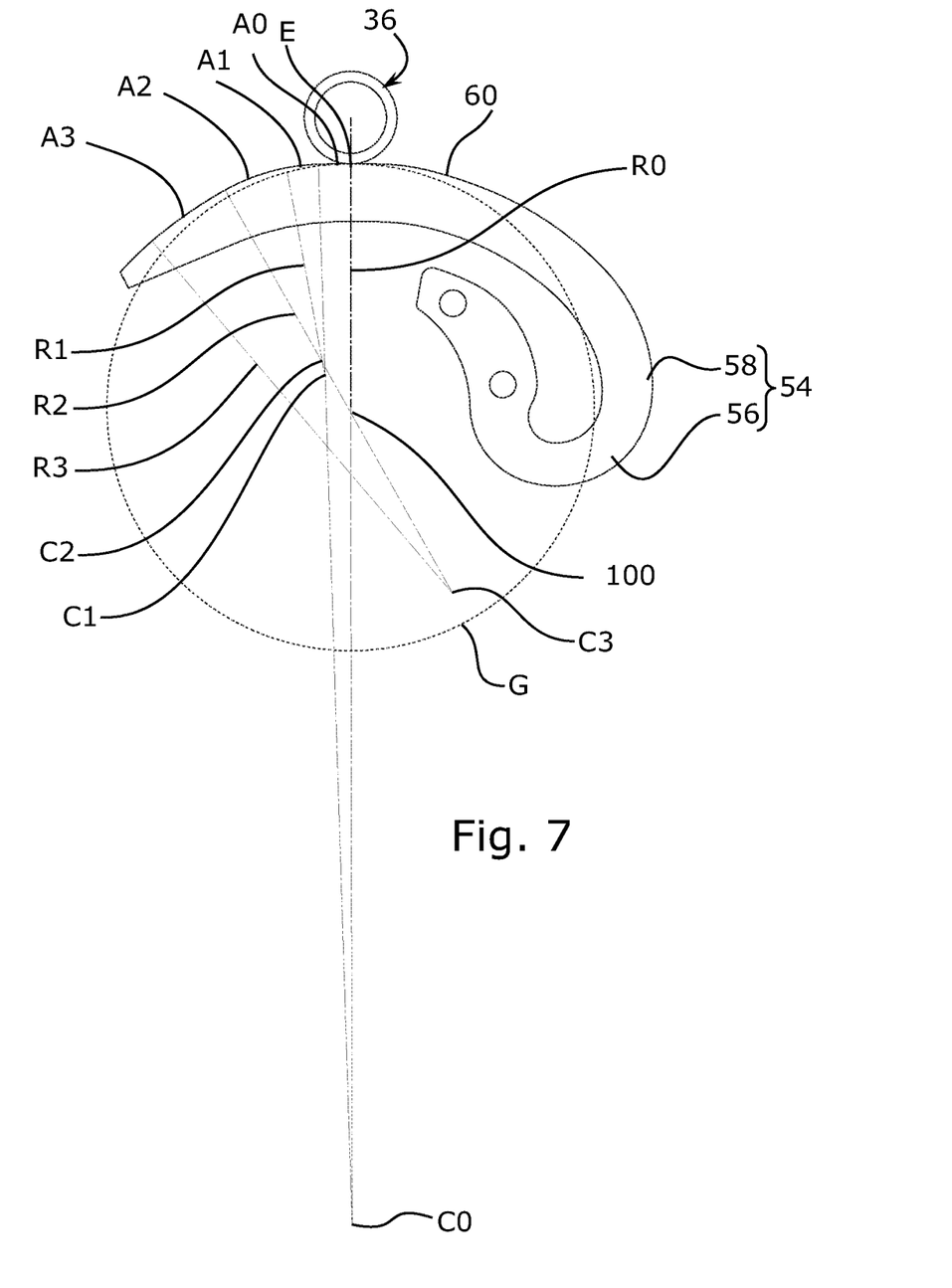
FIG. 7 is a schematic view of an alternative profile to the profile of FIG. 5.
Figure 8:
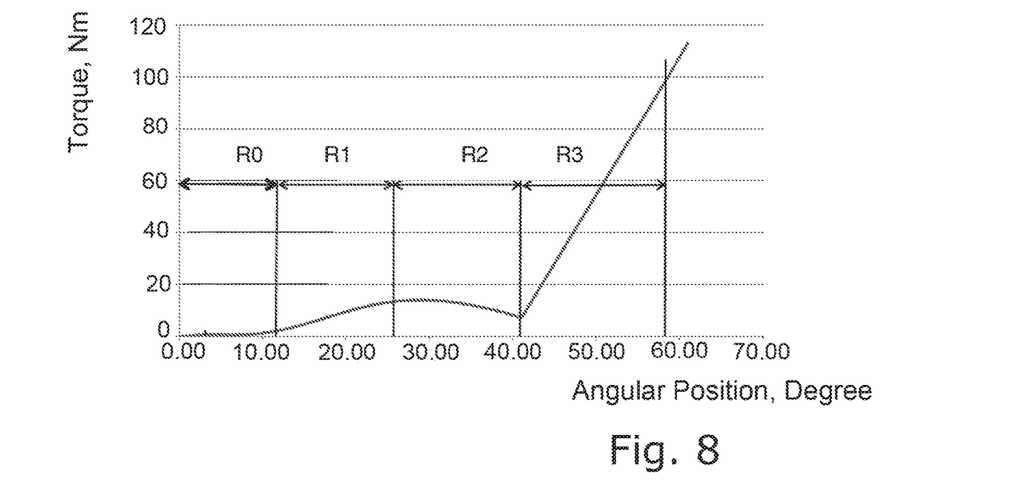
FIG. 8 is a graph of a characteristic curve of the torque of the filtering mechanism corresponding to the profile of FIG. 7.

FIG. 7, for example, illustrates a profile having four successive circular arcs having radii R0, R1, R2, and R3, such that R0>R, R0>>R1, R1>R2, R2<<R3, R being the radius of pitch circle G, the directly adjacent arcs being co-tangent at their intersection as in the first embodiment. A profile of this kind results in a correlation between torque and angular deflection as illustrated in FIG. 8: the torque is a continuous function of angular deflection, but a function that is not monotonic and can be derived only in sections. It is evident in particular that circular arc A2 having radius R2 corresponds to a negative slope of the curve, i.e. to a negative angular stiffness. This corresponds to a zone of the cam track profile which approaches the pitch circle in the forward direction.

Figure 9:
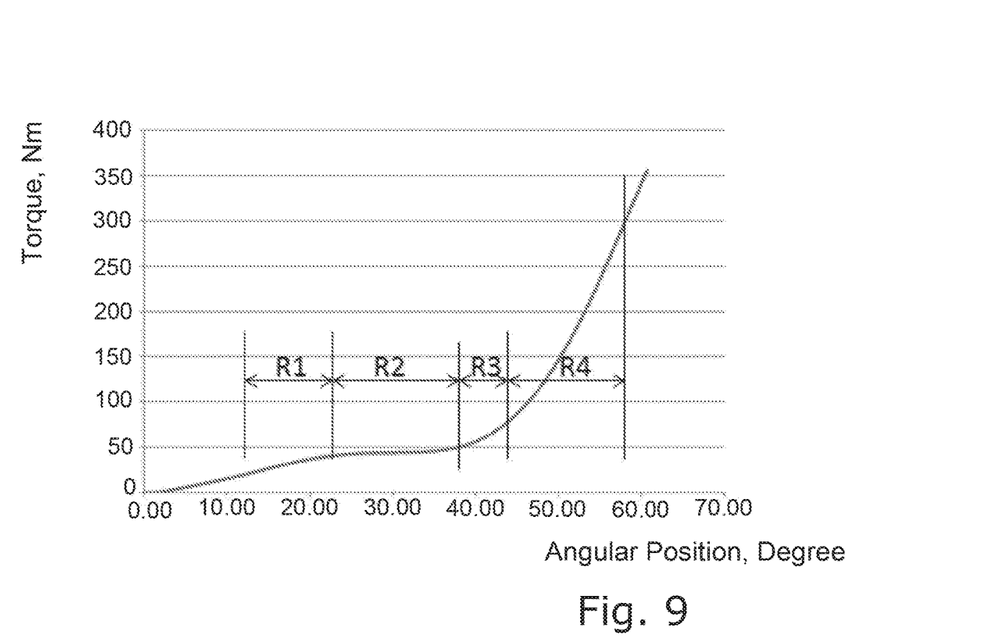
FIG. 9 is a graph of a characteristic curve of the torque of the filtering mechanism corresponding to another profile of the cam track.

FIG. 9 illustrates the characteristic curve for torque as a function of angular deflection for a different profile, where R0>R, R1<R0, R2<R1, R3>R2, and R4>R3, but with circular arc lengths different from the previous embodiment so that the angular stiffness remains positive or zero at all points.

It is apparent that whatever the shape of cam track 60 and the positioning of cam follower 36 on cam track 60, flexible blade 54 is flexed in such a way that the point of contact between cam follower 36 and cam track 60 is on pitch circle G. Since cam track 60 faces radially outward, the stiffness in a given rotation direction at the contact point will be negative if that portion of cam track 60 which will be traveled along from the contact point in that rotation direction is arranged below pitch circle G when cam follower 36 is at the contact point. Conversely, the stiffness is positive if the portion of cam track 60 which is in the vicinity of the contact point, and which will be traveled along starting from the contact point in that rotation direction, is arranged above pitch circle G when cam follower 36 is at the contact point.

Figure 10:
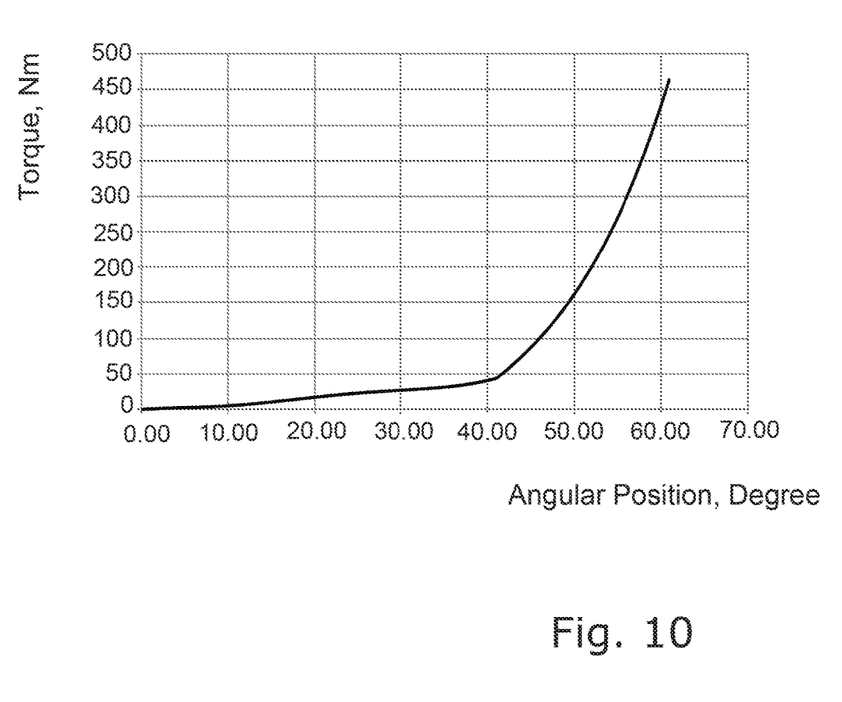
FIG. 10 is a graph of a curve resulting from combining the torque characteristics illustrated in FIGS. 6 and 8.

Particularly advantageously, two blades having different profiles can be combined for one torsion filtering mechanism, for example one blade of the type in FIGS. 5 and 6 and one blade of the type in FIGS. 7 and 8. With such a combination it is possible to obtain a resulting torque which is the sum of the torques of each blade, a graph of which is illustrated in FIG. 10. It should be emphasized that the two blades of FIGS. 5 and 7 have been positioned in such a way that they are jointly in their reference position with respect to their respective cam follower.

Note that the general shape of the curve of FIG. 10 is similar to that of FIG. 9, but that the maximum torque values obtained for the maximum angular deflection of 60° are substantially higher for the mechanism of FIG. 10 having blades with different profiles, than for the mechanism of FIG. 9 having identical blades.

It is evident that the tangent to the curve of FIG. 10, which represents stiffness, is low in the range of angular deflection from 20° to 40° and higher in the range from 40° to 60°. More precisely, it is evident that in the range between 20° and 40° the angular stiffness is less than 60 Nm/rad. In the range of angular deflection between 50° and 60°, conversely, the angular stiffness is greater than 800 Nm/rad, which allows the filtering mechanism to respond to a wide range of torques between 0 and 450 Nm, with a low stiffness over a significant portion of the angular deflection range for torques less than 50 Nm.

This result is obtained in particular by combining, over a given angular range (between 30° and 40°), a positive stiffness for the blade of FIG. 5 and a negative one for the blade of FIG. 7, yielding a resulting value of almost zero for the angular stiffness in that angular deflection range.

It thus becomes possible to design a particularly interesting characteristic using cam profiles that individually remain simple. In particular, this design of each cam profile using successive circular arcs simplifies dimensional checks in the production process.

The examples depicted in the Figures and discussed above are of course provided only for illustration and are not limiting.

In the embodiments above, cam track 60 is convex and is disposed radially inside cam follower 36 in a location centered on axis of revolution 100. The proposed solution can be transposed, however, to a concave cam track arranged radially inside the cam follower, as illustrated in the application FR 3000155. It is also transferrable to a concave cam track arranged radially outside the cam follower, as illustrated in application FR 3045117 (not published on the filing date of the present Application).

The torsion filtering mechanism according to the present invention using (a) flexible blade(s) can constitute a dual mass flywheel as illustrated in FIG. 1. It can also constitute an inertial deflector or a pendulum oscillator arranged in bypass fashion with respect to the torque path.

Provision is explicitly made that the various embodiments illustrated can be combined with one another in order to propose others. Any characteristic that has emerged for one skilled in the art from the totality of the elements of the present invention, and that has been specifically disclosed only in relation to other characteristics identified in one or more embodiments, can be implemented as a variant of said embodiment or embodiments without being combined with all of the other characteristics of that or those embodiments, and/or can be combined, as applicable, with other characteristics proceeding from another embodiment deriving from all the elements of the present invention, provided such has not been expressly excluded or technical circumstances do not make such combinations impossible or devoid of purpose.

The invention claimed is:

1. A torsion filtering mechanism for a torque transmission device, the torsion filtering mechanism comprising:
   a first rotating member capable of rotating around an axis of revolution of the torsion filtering mechanism;
   a second rotating member capable of rotating around the axis of revolution and oscillating with respect to the first rotating member;
   at least one cam track carried by one of the first and second rotating members, the at least one cam track being capable of rotating around the axis of revolution with the rotating member carrying the at least one cam track, and being elastically connected to the rotating member carrying the at least one cam track, in order to exhibit a degree of freedom of movement with respect to the rotating member carrying the at least one cam track; and
   at least one cam follower associated with the at least one cam track and carried by the other of the first and second rotating members, the at least one cam follower being capable of traveling along the at least one cam track between a retrograde end of the at least one cam track and a forward end of the at least one cam track, while causing a variable displacement of the at least one cam track with respect to the rotating member carrying the at least one cam track,
   wherein the at least one cam track has, in a section plane perpendicular to the axis of revolution, a profile having a plurality of circular arcs (A0, A1, A2, A3, A4) adjacent pairwise and having an intersection point pairwise, the profile being such that at least two adjacent circular arcs from among the circular arcs (A0, A1, A2, A3, A4) have different finite or infinite radii of curvature, and indistinguishable tangents at the intersection point.

2. torsion filtering mechanism according to claim 1, wherein the profile is such that every pair of adjacent circular arcs from among the circular arcs (A0, A1, A2, A3, A4) is constituted by circular arcs having different finite or infinite radii of curvature, and indistinguishable tangents at the intersection point.

3. The torsion filtering mechanism according to claim 2, wherein the plurality of circular arcs (A0, A1, A2, A3, A4) comprises at most ten circular arcs.

4. The torsion filtering mechanism according claim 2, wherein the plurality of circular arcs (A0, A1, A2, A3, A4) comprises at least three circular arcs.

5. The torsion filtering mechanism according to claim 1, wherein the plurality of circular arcs (A0, A1, A2, A3, A4) is constituted by at most ten circular arcs.

6. The torsion filtering mechanism according claim 5, wherein the plurality of circular arcs (A0, A1, A2, A3, A4) comprises at least three circular arcs.

7. The torsion filtering mechanism according to claim 1, wherein the plurality of circular arcs (A0, A1, A2, A3, A4) comprises at least three circular arcs.

8. The torsion filtering mechanism according to claim 7, wherein at least one circular arc of the profile has a circular arc adjacent the forward end of the at least one cam track from among the circular arcs (A0, A1, A2, A3, A4) of the profile, and a circular arc adjacent the retrograde end of the at least one cam track from among the circular arcs (A0, A1, A2, A3, A4) of the profile, and has a radius greater than the radius of the circular arc adjacent the forward end of the at least one cam track and greater than the radius of the circular arc adjacent the retrograde end of the at least one cam track.

9. The torsion filtering mechanism according to claim 8, wherein at least one circular arc of the profile has a circular arc adjacent the forward end of the at least one cam track from among the circular arcs (A0, A1, A2, A3, A4) of the profile, and a circular arc adjacent the retrograde end of the at least one cam track from among the circular arcs (A0, A1, A2, A3, A4) of the profile, and has a radius less than the radius of the circular arc adjacent the forward end of the at least one cam track and less than the radius of the circular arc adjacent the retrograde end of the at least one cam track.

10. The torsion filtering mechanism according to claim 7, wherein at least one circular arc of the profile has a circular arc adjacent the forward end of the at least one cam track from among the circular arcs (A0, A1, A2, A3, A4) of the profile, and a circular arc adjacent the retrograde end of the at least one cam track from among the circular arcs (A0, A1, A2, A3, A4) of the profile, and has a radius less than the radius of the circular arc adjacent the forward end of the at least one cam track and less than the radius of the circular arc adjacent the retrograde end of the at least one cam track.

11. The torsion filtering mechanism according to claim 1, wherein the at least one cam track faces radially in a direction of abutment against the at least one cam follower; wherein the at least one cam follower defines a pitch circle (G) for contact with the at least one cam track, centered on the axis of revolution; and wherein in at least one reference position of the filtering mechanism, the profile is at a positive or zero distance from the pitch circle (G), measured in the abutment direction, at every point.

12. The torsion filtering mechanism according to claim 11, wherein in the reference position, the at least one cam follower is in abutment against a reference circular arc (A0) of the profile at a reference contact point (E), the line normal to the reference circular arc (A0) at the reference contact point (E) intersecting the axis of revolution.

13. The filtering mechanism according to claim 12, wherein when the filtering mechanism is in the reference position, at least one of the circular arcs (A0, A1, A2, A3, A4) of the profile moves closer to the pitch circle (G) while moving away from the reference contact point.

14. The torsion filtering mechanism according to claim 12, wherein the reference circular arc (A0) has a finite or infinite radius that is always greater than the radius of the pitch circle (G).

15. The torsion filtering mechanism according to claim 1, wherein the at least one cam track faces radially outward and the at least one cam follower is arranged radially outside the at least one cam track.

16. The torsion filtering mechanism according to claim 1, wherein the at least one cam follower has a follower roller.

17. The torsion filtering mechanism according to claim 1, wherein the at least one cam track is formed on a flexible blade having a base fastened to the one of the first and second rotating members carrying the at least one cam track.

18. A torsion filtering mechanism according to claim 1, wherein it furthermore comprises:
   at least one other cam track carried by one of the first and second rotating members, the at least one other cam track being capable of rotating around the axis of revolution with the rotating member carrying the at least one other cam track and being elastically connected to the rotating member carrying the at least one other cam track, in order to exhibit a degree of freedom of movement with respect to the rotating member carrying the at least one other cam track; and
   at least one other cam follower associated with the at least one other cam track and carried by the other of the first and second rotating members, the at least one other cam follower traveling along the at least one other cam track causing a variable displacement of the at least one other cam track with respect to the rotating member carrying the at least one other cam track, wherein the at least one other cam track exhibits, in a section plane perpendicular to the axis of revolution, a profile constituted by a plurality of circular arcs (A0, A1, A2, A3, A4) adjacent pairwise, the profile being such that any two adjacent circular arcs from among the circular arcs (A0, A1, A2, A3, A4) have different radii of curvature and one intersection point, and have indistinguishable tangents at the intersection point.

19. The torsion filtering mechanism according to claim 18, wherein the at least one cam track and the at least one other cam track have different profiles.

* * * * *